United States Patent [19]
Heinonen et al.

[11] Patent Number: 5,444,264
[45] Date of Patent: Aug. 22, 1995

[54] METHOD FOR CHECKING THE WORKING CONDITION OF AN OPTICALLY OPERATED PROXIMITY SWITCH

[75] Inventors: Ilkka Heinonen, Tampere; Markku Hellsten, Forssa; Timo Malm, Tampere, all of Finland

[73] Assignee: Mitron OY, Forssa, Finland

[21] Appl. No.: 211,302

[22] PCT Filed: Sep. 30, 1992

[86] PCT No.: PCT/FI92/00262
  § 371 Date: Mar. 30, 1994
  § 102(e) Date: Mar. 30, 1994

[87] PCT Pub. No.: WO93/07510
  PCT Pub. Date: Apr. 15, 1993

[30] Foreign Application Priority Data
  Sep. 30, 1991 [FI] Finland ................... 914599

[51] Int. Cl.⁶ .................................... G01N 21/86
[52] U.S. Cl. ........................... 250/559.29; 250/221
[58] Field of Search ............... 250/221, 222.1, 229, 250/560, 561; 341/31

[56] References Cited

U.S. PATENT DOCUMENTS

4,259,591  3/1981  Morris et al. ............... 250/560
4,769,550  9/1988  Dolnick .
4,899,041  2/1990  Fetzer et al. .

*Primary Examiner*—David C. Nelms
*Attorney, Agent, or Firm*—Pollock, Vande Sande & Priddy

[57] ABSTRACT

The invention relates to a method in an optically operated proximity switch, particularly for checking the working condition of the proximity switch. Accordingly to the method, the proximity switch is fitted with a control circuit which is switched on at certain intervals. The control circuit comprises, in addition to a coupling, a controlling receiver circuit and a controlling transmitter circuit, whereby the working condition of the transmitter and the receiver is checked. The proximity switch further comprises reflecting device, whereby the control pulse is reflected to the receiver.

8 Claims, 3 Drawing Sheets

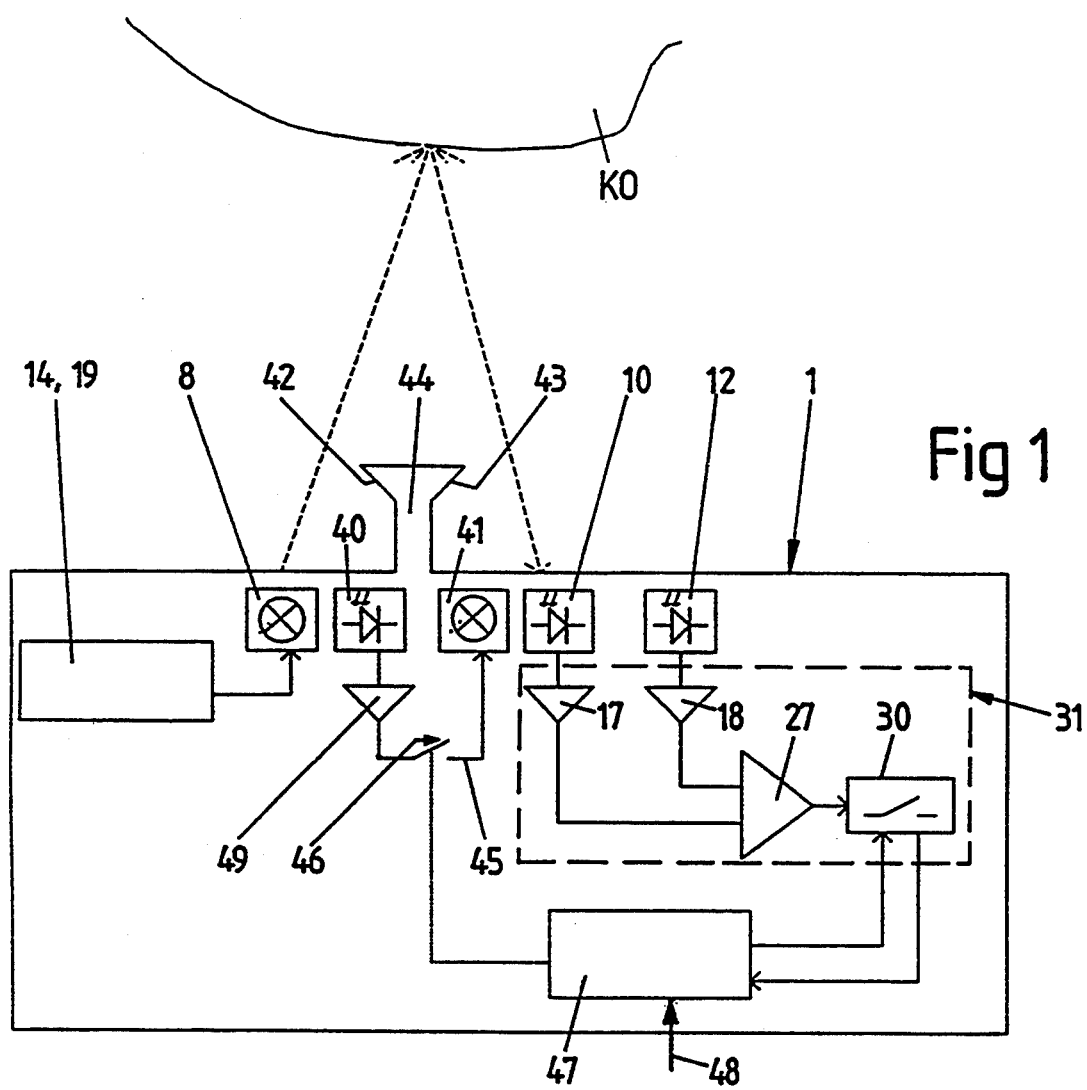
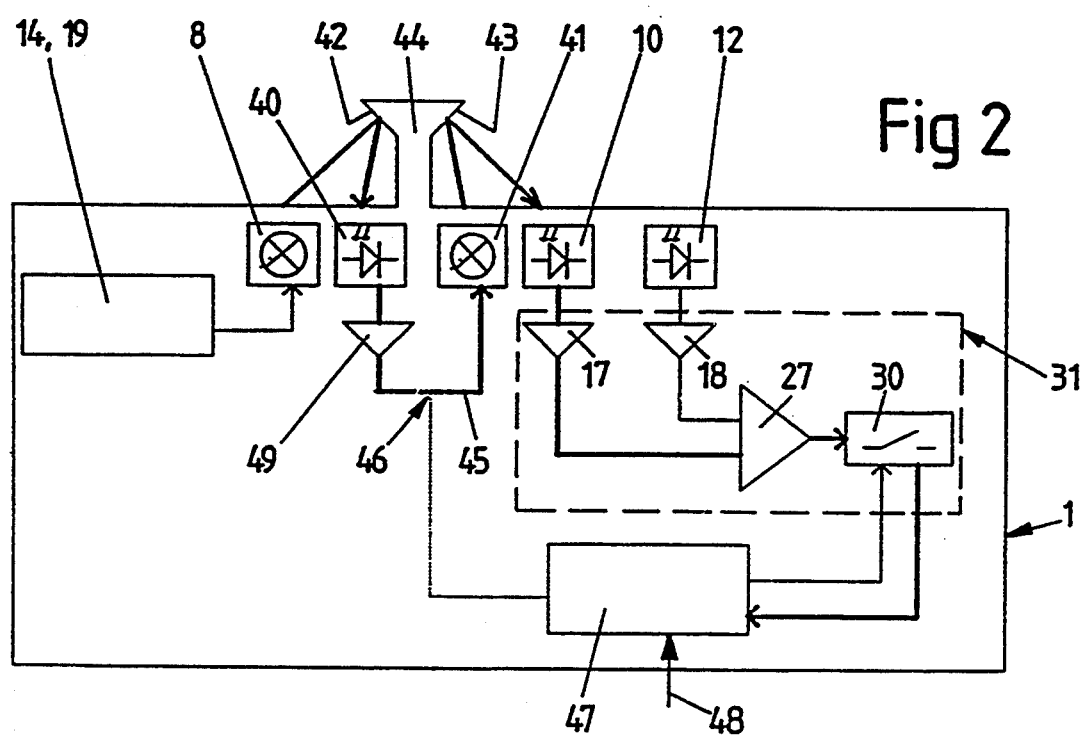

METHOD FOR CHECKING THE WORKING CONDITION OF AN OPTICALLY OPERATED PROXIMITY SWITCH

FIELD OF THE INVENTION

The invention relates to a method in an optically operated proximity switch. It utilizes at least one transmitter means which sends a beam in a first direction into the environment and at least one receiver means whose receiving direction is so directed that it intersects the beam of the transmitter means in the detection zone of the proximity switch. Further, the proximity switch comprises a processing circuit for processing the output signal of the said at least one receiver means for monitoring the situation in the detection zone.

BACKGROUND OF THE INVENTION

A method similar to that presented above is known e.g. from the U.S. Pat. No. 4,899,041. However, there is no indication how the working condition of the proximity switch according to the publication is checked up during its operation. It is very important to check up the working condition particularly in applications where the proximity switch is placed in connection with a moving device, such as an automatically controlled car or robot, and the proximity switch is used particularly for securing occupational safety. Consequently, it is particularly important to secure that the proximity switch works flawlessly in all conditions. It is a problem with apparatuses related to work safety that workers who move in the operation zone of e.g. an automatically operated car or robot and know that the car or robot is equipped with a proximity switch monitoring the environment of the apparatus, presume that the proximity switch works flawlessly. Thus, according to the presumption mentioned above, the workers move relatively freely in the zone of operation of the said apparatuses. Consequently, high requirements are set particularly for these applications of a proximity switch that the proximity switch is in good working order, and if it is not, the apparatus having the proximity switch must be stopped immediately after detection of a fault.

The purpose of this invention is to present a method by which the working order of the proximity switch can be checked up during the actual operation of the proximity switch in a way that no risks are induced in monitoring the situation in the detection zone. For attaining this purpose, the method according to the invention is primarily characterized in that the following steps are taken for securing the working order of the proximity switch:

at least one reflecting means is placed in the range of the beam of at least one transmitter means, at least one controlling receiver means is placed in the range of emission from the reflecting means, and a control circuit comprising the at least one controlling receiver means is switched on at certain intervals, whereby the processing circuit of the proximity switch is controlled on the basis of the output signal of the said at least one controlling receiver means.

By the method presented above, the working condition of the transmitter means in the optically operated proximity switch can thus be monitored and a control instruction corresponding to the control result can be transmitted to the processing circuit of the proximity switch. In other words, if the controlling receiver means receives from the reflecting means emission reflected from the transmitter means, the transmitter means is functioning and the proximity switch is in working order for this part and the protective surfaces are sufficiently clean. If this does not happen, the control circuit comprising the controlling receiver means and being connected to the processing circuit discharges an instruction by which the operations of the apparatus, such as e.g. an automatically controlled car or robot, having the proximity switch are stopped at least within the scope of occupational safety or other criteria, and e.g. a visual signal is given of the malfunction of the proximity switch.

The method according to the invention is further characterized in that the following steps are taken for checking up the working order of the proximity switch:

at least one controlling transmitter means is placed in contact with the proximity switch, at least one reflecting means is placed in the range of the beam of the at least one controlling transmitter means, at least one controlling transmitter means and the at least reflecting means are placed so that the at least one receiver means is placed in the range of emission from the reflecting means, and a control circuit comprising the at least one controlling receiver means is switched on at certain intervals, whereby the processing circuit of the proximity switch is controlled on the basis of the output signal of the at least one controlling receiver means.

Consequently, the method described above can be used to check up the working condition of the receiver means monitoring the detection zone of the proximity switch and the impurity of the protective surfaces.

In the following, the invention is described in more detail with reference to the appended drawings. In the drawings,

BRIEF DESCRIPTION OF THE DRAWINGS

FIG. 1 shows a schematic outline of an embodiment of the proximity switch, in which the method can be applied in a situation when the proximity switch is operating normally, FIG. 2 shows an embodiment according to FIG. 2 during application of the method.

DETAILED DESCRIPTION OF THE PREFERRED EMBODIMENTS

Figure 3:
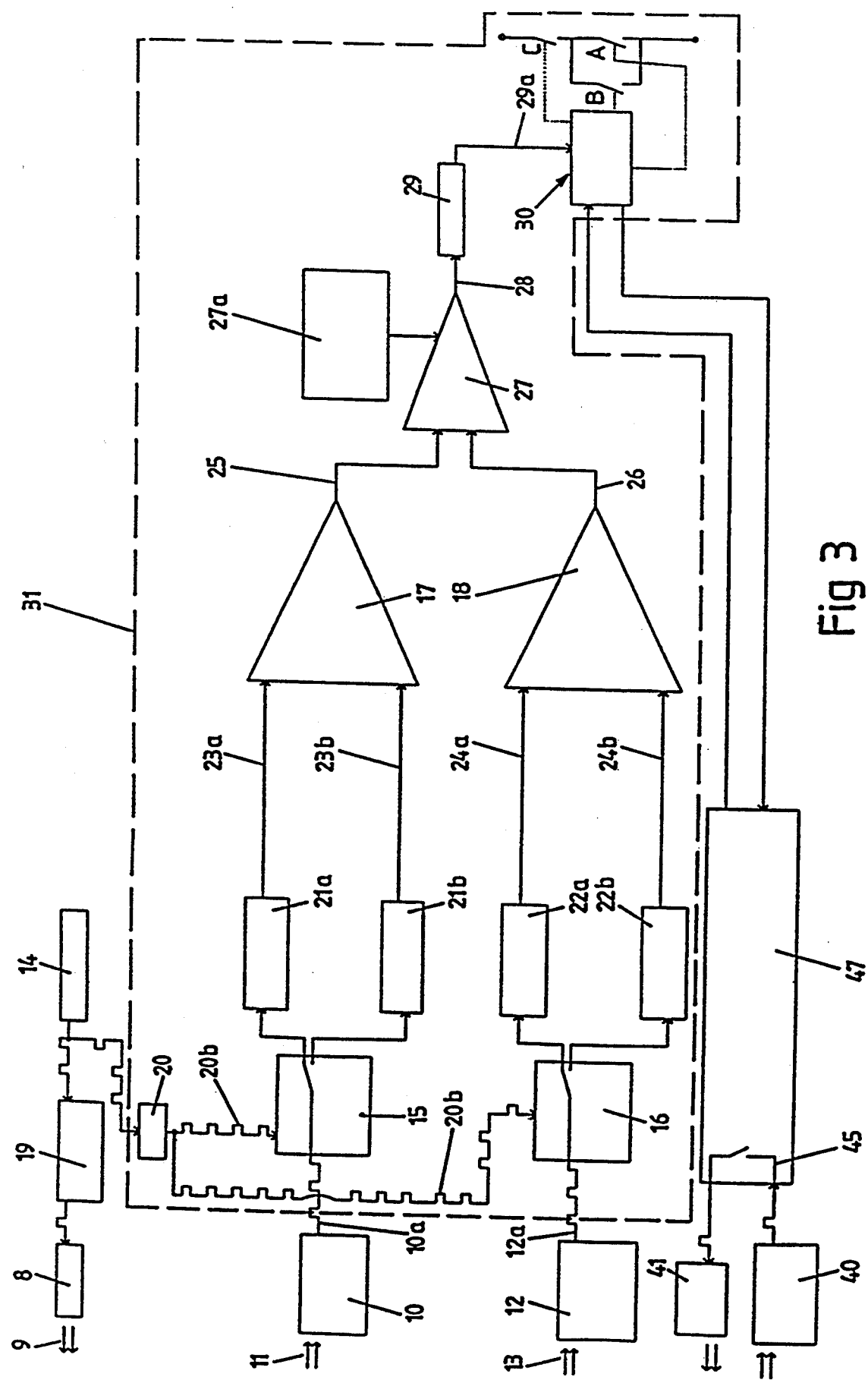
FIG. 3 shows a more detailed schematic diagram of the embodiment of the proximity switch applying the method according to FIGS. 1 and 2.

FIG. 1 shows schematically an embodiment of the proximity switch in a situation of detection. Thus the proximity switch 1 detects an object KO in the detection zone. Firstly, the proximity switch 1 comprises at least one transmitter means 8 which transmits a beam in a first direction into the environment. Further, the proximity switch 1 comprises at least one receiver means 10 whose direction of receiving is so directed that it intersects the beam of the transmitter means 8 in the detection zone of the proximity switch, whereby the receiver means receives emission reflected from the object KO. In the embodiment shown in FIG. 1, there is also another receiver means 12 whose direction of receiving is so directed that it monitors emission coming or reflected from the background area outside the detection zone. In addition, the proximity switch is fitted with a processing circuit which is limited by broken lines and presented by the reference number 31 in FIG. 1. In FIGS. 1 and 2, the processing circuit 31 is presented in a general form. The more detailed structure of an embodiment of circuit 31 is shown in FIG. 3.

For applying the method according to the invention, the proximity switch is fitted with at least one controlling receiver means 40 and at least one controlling transmitter means 41. The proximity switch is further connected with reflecting means 42 and 43, for checking the working condition of the transmitter means 8 on one hand, and for the receiver means 10 monitoring the detection zone and, when necessary, for the receiver means monitoring the background on the other hand. Furthermore, the method controls the purity of the protective surfaces of the transmitter and receiver means. The reflecting means can be fixedly mounted in the frame of the proximity switch 1, e.g. supported by a suitable support frame 44 or the like. Naturally, the reflecting surfaces 42, 43 with their support frames can be made also movable in relation to the proximity switch, whereby they are, for the time of the control operation, particularly placed in a way required for giving the signals shown as bold lines in FIG. 2. Particularly for reasons of durability and reliability, it is important to mount the reflecting surfaces 42, 43 to be fixed and immobile in relation to the proximity switch 1.

Both the controlling receiver means 40 and the controlling transmitter means 41 are coupled with a control circuit 45 with a coupling 46 or the like which is switched off for the time of the control operation, whereby the control circuit receives the necessary control currency from the transmit control circuit 14, 19. The control circuit 45 and particularly the operation of its coupling 46 is controlled by a test control unit 47 which is equipped with a timer (not shown) for checking up the working condition at adjustable intervals. Further, it is possible to affect the test control circuit with an external control instruction (arrow 48). The test control circuit is primarily affected by an external control instruction. If no test instruction can be given by the device that the proximity switch is connected with, the proximity switch gives a test instruction automatically at certain intervals. As seen in FIG. 2, the output of the controlling receiver means 40 is connected with an amplifier circuit 49 which amplifies and modifies the output signal into a form suitable for the controlling transmitter means 41. Consequently, in the embodiment shown in FIG. 2, the signal which comes from the transmit control circuit 14, 19 and is relative to the control current, passes through means 8 →40 →49 →46 →41 →43 →10 →31, whereby transmission of the signal is prevented by faults or impurities of the protective surfaces in the chain above, whereby the relay equipment 30 operates in a manner required by fault detection as will be described further on.

For the technical structure of the processing circuit 31, particularly the schematic diagram of FIG. 3 will be described in more detail in the following.

1. Transmitter means

The transmitter means 8 consists of two GaAlAs LEDs (Honeywell SEP 8709-304) in series, the 1.5 A current flowing through the same being controlled with a Darlington power transistor 19 which, in turn receives a base current from an oscillator 14 (timer circuit TI 555). Using two LEDs, the same current can be used for obtaining double luminosity. The diodes forming the transmitter means 8 transmit pulsed infrared light with a narrow cone, 20°, and a wavelength of 880 nm at a power of 55 mW/cm$^2$ indicated with the reference numeral 9.

The length of the pulse is 10 μs, and the pulse ratio (operating cycle ratio) is 1:16. The pulse ratio and the pulse length can be adjusted, when needed, by means of diodes and an adjustable resistor connected to the timer circuit (not shown in FIG. 4), particularly in the range between 1:1 and 1:20. With pulses in the order of a microsecond or less, the direct-current values of the infrared diode can be exceeded even 10 times, if the pulse ratio is less than 1:10, and the transmitting capacity of the diodes can thus be increased. In this short time, the thermal losses of the infrared diode do not even out to the environment by convection and thermal conduction through the conductors of the diode. With high currents, however, the aging of the diode is substantially accelerated. If the pulse ratio is high, the maximum average dissipation power is a limiting factor, irrespective of the pulse length. The longer the pulse, the less can the peak power be raised from the direct-current value by decreasing the pulse ratio.

2. Receiver means

The reception 10 and 12 is synchronized with the transmitter means 8 by coupling circuits 15 and 16. Because the receiver means 10 and 12 only receive light during the transmitting pulse, the effect of background lights is minimized and the signal-noise ratio of the receiver means increases.

Both receiver means 10 and 12 have detection of infrared light by two Si light diodes connected in parallel and preloaded in the reverse direction, with a cone width of 18°. Parallel connection is used for increasing the photosensitive surface area and thus photosensitivity. The maximum sensitivity of the Si light diode, 60 μA/mW/cm$^2$ at an intensity of radiation of 5 mW/cm$^2$, is close to the transmitting wavelength 880 nm of the GaAlAs LED.

In addition, the receiver means 10 and 12 have a small-size amplifier (Texas Instruments TI TLC272CP), an analogous coupling (Harris HI-303-5) controlled by a time delay circuit (Toshiba 74HC132P) with a delayed transmitting pulse, two RC integrators before an instrumentation amplifier (TI TLC274CN). The activation of the receiver means 10 and 12 by the object or by a disturbance light is displayed by a red LED light.

From the amplifyers of the receiver means 10 and 12, the output or incoming signals 10a, 12a are transmitted by means of (two) coupling circuits 15 and 16, by which the signals 10a, 12a received during the transmitting pulse are directed to first condensator circuits 21a, 22a (C=330 nF), and by means of control signals 20b coming from the oscillator 14 through the time delay circuit 20 during a rest period to second condensator circuits 21b, 22b (C=330 nF) through resistances (R=100 kΩ). The output signal 10a, 12a is averaged with a time constant RC (RC=3.3 ms) to the condensators of the circuits 21a, 22a, in which a voltage proportional to the average signal level (transmit signal) of pulses from the amplifier is induced. By means of averaging, even a very weak signal can be distinguished from noise. The signal-noise ratio of an assembled device is improved by averaging by a coefficient of $\sqrt{(2RC/t)}=28$, in which t is the time of 8 μs of switching off during the pulse.

In the first condensator circuit 21a, which is connected to the receiver means 10 directed at a detection distance, a voltage is induced in relation to the infrared light reflected from the object, the object being in the detection zone, and a voltage proportional to the intensity of the background light only is induced in the second condensator circuit 21b. If there is no object in the detection zone, both condensator circuits 22a, 22b have equally low voltages. In the condensators 22a, 22b connected to the receiver means 13 directed to the background, equally low voltages are induced by the background, irrespective of whether the object is in the detection zone or not.

Two instrumentation amplifiers 17 and 18 are used for comparing the voltages of condensator pairs 21a, 21b on one hand and 22a, 22b on the other hand with each other. The transmitting voltage of the instrumentation amplifier 17 is 0 V, if its inlet voltages 23a, 23b are equal, i.e. the receiver means 10 does not detect an object. If there is an obstacle in the detection zone of the receiver means 10, a voltage with a higher absolute value is induced at the inlet 23a than at the inlet 23b, whereby the output 25 of the instrumentation amplifier 17 is proportional to the inlet voltage difference. Correspondingly, the voltages are equal at the inlets 24a and 24b of the instrumentation amplifier 18 when there is no object in the vicinity of the detection zone. Thus a so-called floating reference level is obtained, on which the reflection coefficients do not affect the control operations of the proximity switch.

3. Comparator and relay circuit

A comparator 27 including a control circuit 27a for fine adjustment of the zero point and the distance (TI TLC272CP) is used for comparing the signals proportional to the output signals (DC ouput voltage levels) of the receiver means 10 and 12 with each other. If the signals (outputs 25 and 26) are unequal (in practice, the output 25 of the instrumentation amplifier 17 exceeds the output 26 of the instrumentation amplifier 18), the object is within the detection distance, whereby the state of the comparator output 28 is changed. Thus, the output signal of the receiver means 12 directed to the background, modified by parts 16, 22a, 22b, 18, 27 of the processing means, forms a so-called floating reference level for the output signal of the receiver means 12 functioning as the actual coupling, which signal is modified by parts 15, 21a, 21b, 17, 27 of the processing means. There is a barrier voltage of about 1 V between the inlet poles of the comparator 27. This barrier voltage can be adjusted to change the detection distance. A pulse is given by the comparator to a one-shot circuit 29 (Toshiba TC74HC132P) which affects the actuators of the device or equipment connected with the proximity switch, e.g. switches on the relay device 30 (e.g. Siemens ZW) and keeps it on until the object has exited the detection zone.

Figure 4:
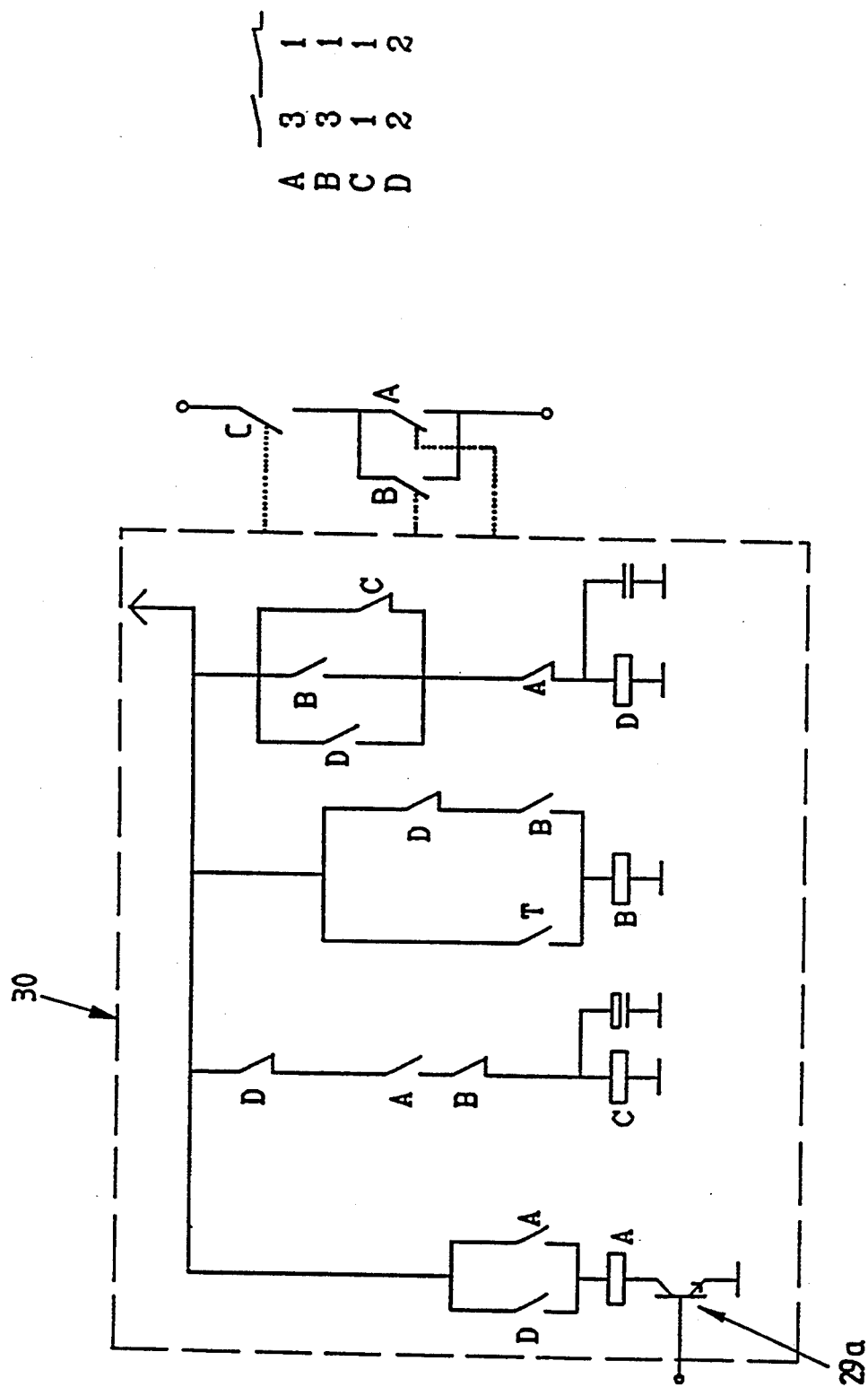
FIG. 4 shows a schematic view of the structure of the relay equipment related to FIG. 3 in more detail.

For the structure of the relay equipment 30, it can be stated with reference to FIG. 4 that the output relay (relay A) changes its state always upon detection by the receiver means 10. In practice, the receiver means 10 receives detection when the object KO is detected in the detection zone or during checking of the working condition or during testing. For the time of checking of the working condition, the output of the relay A is short circuited. Thus the output of the relay A does not affect the operation of the apparatus which the proximity switch is placed in. If there is a checking failure, the relay C is releasing and the output circuit is opened in the same way as during ordinary detection. At least four relays A–D are needed in order to carry out the operation safely. The relays operate in the following manner: The relay A is normally energizing, but it will always release upon receiving detection, i.e. if the object KO is close or the working condition is being checked up. The relay B is normally releasing, but in a situation of checking up, the relay B is energizing. The relay C is normally energizing, but it is releasing upon receipt of detection by the relay A (however, not in a situation of checking up). The relay C remains energizing, even though its control contacts were opened for a short time (less than 500 ms). The condensator connected to the winding of the relay C feeds current to the relay C as long as the control contacts are open. The relay C is permanently releasing, if there is a failure in the automatic checking up or either of the relays B or D is damaged and remains in the energizing state. The relay D is normally releasing, but it will always energize in a situation of detection of the object KO or in a situation of checking up. If there is a fault in any of the relays, the output circuit is opened in a situation of testing at the latest. This operation is based on the use of forced relays. In forced relays A–D, the contacts of the relay remain constantly in the same position in relation to each other. The contacts of the relay are mechanically fixed to each other so that this situation is not changed even in normal cases of failure. For example, if one of the contacts of the relay is welded (e.g. as a result of an excessive current), none of the contacts of the forced contacts can move any longer. In the case of the failure, the undamaged contacts of an ordinary relay may still move. Forced relays are used by utilizing other contacts moving in a way similar to that of the actual control contacts (in a failure situation, these do not move any longer either).

4. Checking of the working condition by the relay equipment

In the beginning of the checking, the relay B is releasing. After this, the checking pulse is directed to the transmitter means 8. The relay D is energizing, and next the relay A is releasing. After the steps described above, the relay D will release, and finally, the relay B will release. After these steps, the proximity switch 1 can detect objects normally again.

The checking must not last longer than about 300 ms. During this time, the relays A, B and D must be switched to and from the other position. The holding time of the relay C must be clearly longer than the time of testing. Using a condensator of 470 microfarads in connection with the winding of the relay C, the holding time of the relay C obtained is about 500 ms (depending on the impedance of the relay).

In general, it can be stated that optical sensors are designed for use as safety devices, and, consequently, the failure of components with a substantial effect in the proximity switch must be automatically controlled. In the method according to the invention, the control is based on automatic checking by which all the operations critical to the detection of an object in the detection zone are tested and checked up. The check-up can be made alternatively either at regular intervals, e.g. at every 10 min from the previous testing or detection (the time can be adjusted) or under direction by external testing instructions. The method can thus be applied firstly to check and test the working condition of the transmitting control circuit 14, 19. Secondly, the method can be used to check the working condition of the transmitter means 8 and the impurity of the protective surfaces. Further, the method can be applied to check the working condition of the receiver means 10 monitoring particularly the detection zone as well as the working condition of the whole processing circuit 31 insofar as it relates particularly to processing and transferring the output signal of the receiver means 10 to the relay equipment 30. Moreover, by short circuiting the relay of the normal detection situation, which is by-passed, for the time of checking by means of the coupling in the relay 30 (FIG. 4) according to the method, the checking can be done without affecting the operation of the apparatus whereto the proximity switch is connected to control its operations. The check-up situation is so secured that in case the short circuiting takes too long a time in the relay equipment, the securing relay C is opened. The proximity switch is thus completely secured in a way that failure of a single component involved in the critical operations for detection is detected in a checking situation at the latest.

On the basis of the foregoing description, it should be obvious to a specialist in the field that the working condition of the proximity switch can be checked also by separate check-up circuits e.g. in a way that the working condition of the transmitter means and the successive control operations of the processing circuit 31 can be tested separately from the control operations in the processing circuit, accounting for the operations of checking up the required working condition of the receiver means 10.

We claim:

1. Method in an optically operated proximity switch, using:
   at least one transmitter means transmitting a beam to the environment in a first direction,
   at least one receiver means whose receiving direction is so directed that it encounters the beam of the transmitter means in the detection zone of the proximity switch, and
   a processing circuit for processing the output signal of said at least one receiver means for monitoring the situation in the detection zone,
   wherein the following steps are taken for checking the working order of the proximity switch:
   at least one reflecting means is placed in range of the beam of the said at least one transmitter means,
   at least one controlling receiver means is placed in the range of the beam reflected from said reflecting means,
   the proximity switch is fitted with at least one controlling transmitter means,
   at least one reflecting means is placed in the range of the beam of said at least one controlling transmitter means, and
   said at least one controlling transmitter means and said at least one reflecting means are placed in a way that said at least one receiver means is placed in the range of the emission reflected from the reflecting means,
   wherein
   said at least one controlling receiver means and said at least one controlling transmitter means are used only for checking the working order of the proximity switch,
   at least one control circuit, separate from the processing circuit and comprising said at least one controlling receiver means and/or said at least one controlling transmitter means, is switched on at certain intervals for checking up the working condition of said at least one transmitter means and at least one receiver means simultaneously, whereby processing circuit of the proximity switch is controlled on basis of the output signal of said at least one controlling receiver means and/or the output signal of the said at least one receiver means.

2. Method according to claim 1, wherein said at least one controlling receiver means and said at least one transmitter means are placed in a joint control circuit in a way that the output of said at least one controlling receiver means is coupled with the input of said at least one transmitter means and wherein the coupling or the like is placed between said parts in the control circuit.

3. Method according to claim 1, wherein an amplifier circuit is placed in the control circuit for amplifying and modifying the output signal of the controlling receiver means into a control pulse suitable for the controlling transmitter means for purposes of transmitting.

4. Method according to claim 1, wherein at least one of the two reflecting means is fixed to the proximity switch, preferably supported by a support frame.

5. Method according to claim 1, wherein a coupling arrangement connected in parallel, preferably an arrangement comprising of relays or contacts in series with these, this arrangement being in connection with the circuit controlling the operations of the apparatus connected with the proximity switch, is placed in connection with the processing means in a way that
   I the first coupling means is switched on during the normal operation of the proximity switch for maintaining the operations of the device connected with the proximity switch, and the second coupling means is open,
   II the second coupling means is closed in the beginning of the checking operation for maintaining the operations of the device connected with the proximity switch during the checking operation,
   III the checking operation is made, whereby the coupling means receives the control related to the checking, changing its state into open state when the check-up pulse passes through the control circuit and the processing circuit,
   IV the coupling means are returned after the checking operation to the positions of normal operation, whereby the first coupling means is opened upon detection of an object in the detection zone, thus disconnecting the circuit controlling the operations of the device.

6. Method according to claim 5, wherein a third coupling means, preferably a relay, operating with a time delay during a checking operation, is placed in series with the coupling arrangement, whereby
   the third coupling means is kept in the on-position during the normal operation of the proximity switch for maintaining the operations of the device connected with the proximity switch,
   the third coupling means is arranged to open during the checking operation after the allowed time for the checking operation if the phase III is not carried out.

7. Method according to claim 6, wherein
   the time of duration allowed for the checking operation is defined to be maximum 300 ms and
   the time delay of the third coupling means is defined to be longer than 300 ms, preferably about 500 ms.

8. Method according to claim 6, wherein the coupling means are formed of relays with guided contacts.

* * * * *